(12) United States Patent
Morris et al.

(10) Patent No.: US 12,528,440 B2
(45) Date of Patent: Jan. 20, 2026

(54) SEATBELT SYSTEM

(71) Applicant: GM Global Technology Operations LLC, Detroit, MI (US)

(72) Inventors: Tyler P. Morris, Madison Heights, MI (US); Ryan Aaron Gellner, Livonia, MI (US); Benjamin S. Ngu, Royal Oak, MI (US); Jaclyn Press Sproule, West Bloomfield, MI (US); Fernando Mercuri, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 69 days.

(21) Appl. No.: 18/497,652

(22) Filed: Oct. 30, 2023

(65) Prior Publication Data

US 2025/0136042 A1    May 1, 2025

(51) Int. Cl.
*B60R 22/46*  (2006.01)
*B60R 21/015*  (2006.01)
*B60R 22/36*  (2006.01)

(52) U.S. Cl.
CPC .............. *B60R 22/46* (2013.01); *B60R 22/36* (2013.01); *B60R 21/01512* (2014.10); *B60R 2022/4666* (2013.01)

(58) Field of Classification Search
CPC ....... B60R 22/46; B60R 22/36; B60R 22/343; B60R 2022/4666; B60R 2022/4858; B60R 2022/284; B60R 2022/288
See application file for complete search history.

(56) References Cited

U.S. PATENT DOCUMENTS 6,290,159 B1 * 9/2001 Specht ................ B60R 22/3413
                                                    280/805
6,655,743 B1 * 12/2003 Parizat ................. B60R 22/343
                                                    297/475
7,600,600 B2 * 10/2009 Inuzuka .................. B60R 22/46
                                                    180/272

(Continued)

FOREIGN PATENT DOCUMENTS

CN         108116361 B  *  2/2022  ............. B60R 22/12
CN         115158216 A  *  10/2022  ............. B60R 22/34

(Continued)

*Primary Examiner* — Anna M Momper
*Assistant Examiner* — Ermia E. Melika
(74) *Attorney, Agent, or Firm* — Honigman LLP; Matthew H. Szalach; Jonathan P. O'Brien (57) ABSTRACT

A seatbelt assembly for a vehicle includes a seatbelt and a base retractor coupled to the seatbelt and configured to allow the seatbelt to extend to a desired length. The base retractor includes a first end portion including a biasing device, a second end portion disposed opposite the first end portion and including a speed-based locking mechanism, and a third portion disposed between the first end portion and the second end portion and including a spindle coupled to the seatbelt. The seatbelt assembly also includes a pretensioner coupled to the base retractor and configured to tighten slack of the seatbelt to ensure proper position of the vehicle passenger. Additionally, the seatbelt assembly includes an electromagnet disposed within or adjacent to the base retractor and configured to enable adjustment of rotational resistance applied to the spindle based on vehicle passenger size.

20 Claims, 7 Drawing Sheets

(56) References Cited

U.S. PATENT DOCUMENTS

| | | | |
|---|---|---|---|
| 9,862,351 B2 | 1/2018 | Bergman | |
| 2005/0017116 A1* | 1/2005 | Kempf | B60R 22/40 |
| | | | 242/384 |
| 2006/0097099 A1* | 5/2006 | Nomura | B60R 22/46 |
| | | | 242/390.2 |
| 2006/0214043 A1* | 9/2006 | Nomura | B60R 22/3413 |
| | | | 242/379.1 |
| 2007/0018445 A1* | 1/2007 | Inuzuka | B60R 22/44 |
| | | | 280/806 |
| 2007/0085319 A1* | 4/2007 | Scherzinger | B60R 22/46 |
| | | | 280/806 |
| 2007/0114318 A1* | 5/2007 | Thogersen | B60R 22/341 |
| | | | 242/381 |
| 2008/0283650 A1* | 11/2008 | Shirokoshi | E05F 15/63 |
| | | | 242/381 |
| 2014/0008478 A1* | 1/2014 | Bergman | B60R 22/343 |
| | | | 242/381 |
| 2014/0158808 A1* | 6/2014 | Han | B60R 22/28 |
| | | | 242/390.8 |
| 2015/0329076 A1* | 11/2015 | Biller | B60R 22/48 |
| | | | 242/396.5 |
| 2019/0054893 A1* | 2/2019 | Vo | B60R 22/341 |
| 2019/0092275 A1* | 3/2019 | Vo | B60R 22/28 |
| 2021/0394707 A1* | 12/2021 | Jessup | B60R 22/3416 |

FOREIGN PATENT DOCUMENTS

| | | | | |
|---|---|---|---|---|
| DE | 102006006795 A1 * | 8/2007 | | B60R 22/28 |
| DE | 102008042020 A1 | 3/2010 | | |
| DE | 102013217238 A1 * | 3/2015 | | B60R 22/34 |
| DE | 102018119789 A1 | 2/2019 | | |
| DE | 102008000984 B4 * | 4/2019 | | B60R 22/3413 |
| EP | 1475282 A1 * | 11/2004 | | B60R 22/4676 |
| EP | 1256493 B1 | 4/2006 | | |
| WO | WO-03059707 A1 * | 7/2003 | | B60R 22/28 |

* cited by examiner

SEATBELT SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a seatbelt system for a vehicle.

Seatbelts are an important safety feature in vehicles. Some seatbelts are configured to retract and/or lock the seatbelt during a vehicle impact event. In a load-limiting seatbelt, the occupant applies a load to the seatbelt during the vehicle impact event, which causes a torsion bar to twist/deform and pay out seatbelt webbing. The amount of seatbelt webbing payout is typically defined by the size of the torsion bar and corresponds to a specified restriction of the load that the seatbelt applies to the occupant A load-limiting seatbelt restraint system is executed by selecting one, two, or three specified load limits. In some examples, the seatbelt system includes a "switch," typically based on seat track position, which sets the load limit at one of two or three discrete values. While current technology provides numerous options, once a configuration is set, changing load profiles is no longer possible.

SUMMARY

In some examples, a seatbelt assembly for a vehicle includes a seatbelt configured to secure a vehicle passenger and spread impact forces across the vehicle passenger's body. Additionally, the seatbelt assembly includes a base retractor coupled to the seatbelt and configured to allow the seatbelt to extend to a desired length. The base retractor includes a first end portion including a biasing device, a second end portion disposed opposite the first end portion and including a speed-based locking mechanism, and a third portion disposed between the first end portion and the second end portion and including a spindle coupled to the seatbelt. In some examples, the seatbelt assembly also includes a pretensioner coupled to the base retractor and configured to tighten slack of the seatbelt to ensure proper position of the vehicle passenger. Further, the seatbelt assembly includes an electromagnet disposed within or adjacent to the base retractor and configured to enable adjustment of rotational resistance applied to the spindle based on vehicle passenger size. In some examples, the electromagnet is disposed between the third portion and the second end portion of the base retractor. In some examples, the electromagnet is at least partially disposed within the spindle of the third portion of the base retractor. In some examples, the electromagnet includes a winding base, a winding core, and a disk. In some examples, the seatbelt assembly also includes a torsion bar coupled to the base retractor. In some examples, the seatbelt assembly is a three-point seatbelt assembly. Additionally, in some examples, the seatbelt assembly may also include a plurality of gears coupled to the base retractor and configured to reduce a base load of the electromagnet. A vehicle may incorporate the seatbelt assembly.

In some examples, a seatbelt system for a vehicle seat includes a sensing system configured to determine a size of a vehicle passenger on the vehicle seat. The seatbelt system also includes a seatbelt assembly including a seatbelt configured to secure a vehicle passenger and spread impact forces across the vehicle passenger's body. The seatbelt assembly also includes a base retractor coupled to the seatbelt and configured to allow the seatbelt to extend to a desired length. Moreover, in some examples, the seatbelt assembly also includes a pretensioner coupled to the base retractor and configured to tighten slack of the seatbelt to ensure proper position of the vehicle passenger. Additionally, the seatbelt assembly may include an electromagnet coupled to the base retractor and configured to enable a continuous load level based on the determined size of the vehicle passenger. In some examples, the sensing system includes a plurality of weight sensing mechanisms to measure a weight of the vehicle passenger. In some examples, the sensing system includes a plurality of height sensing mechanisms to measure a height of the vehicle passenger. Additionally, in some examples, the electromagnet includes a winding base, a winding core, and a disk. In some examples, the seatbelt system also includes a torsion bar coupled to the base retractor. Additionally, in some examples, the seatbelt assembly is a three-point seatbelt assembly. A vehicle may incorporate the seatbelt system.

In some examples, a seatbelt system for a vehicle includes a seatbelt assembly including a seatbelt, a base retractor having a spindle coupled to the seatbelt, and an electromagnet coupled to the base retractor. The seatbelt system also includes a sensing system configured to measure one or more of vehicle passenger weight and vehicle passenger height. Additionally, the seatbelt system includes a vehicle processor for storing vehicle data including one or more of the vehicle passenger weight and the vehicle passenger height. The seatbelt system also includes a server communicatively coupled to the vehicle processor and configured to determine a desired load level of the electromagnet based on one or more of the vehicle passenger weight and the vehicle passenger height. In some examples, the controller is also configured to apply the desired load level of the electromagnet to the spindle. In some examples, the electromagnet includes a winding base, a winding core, and a disk. Additionally, in some examples, a vehicle incorporates the seatbelt system. In some examples, the seatbelt assembly is a three-point seatbelt assembly.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 1:
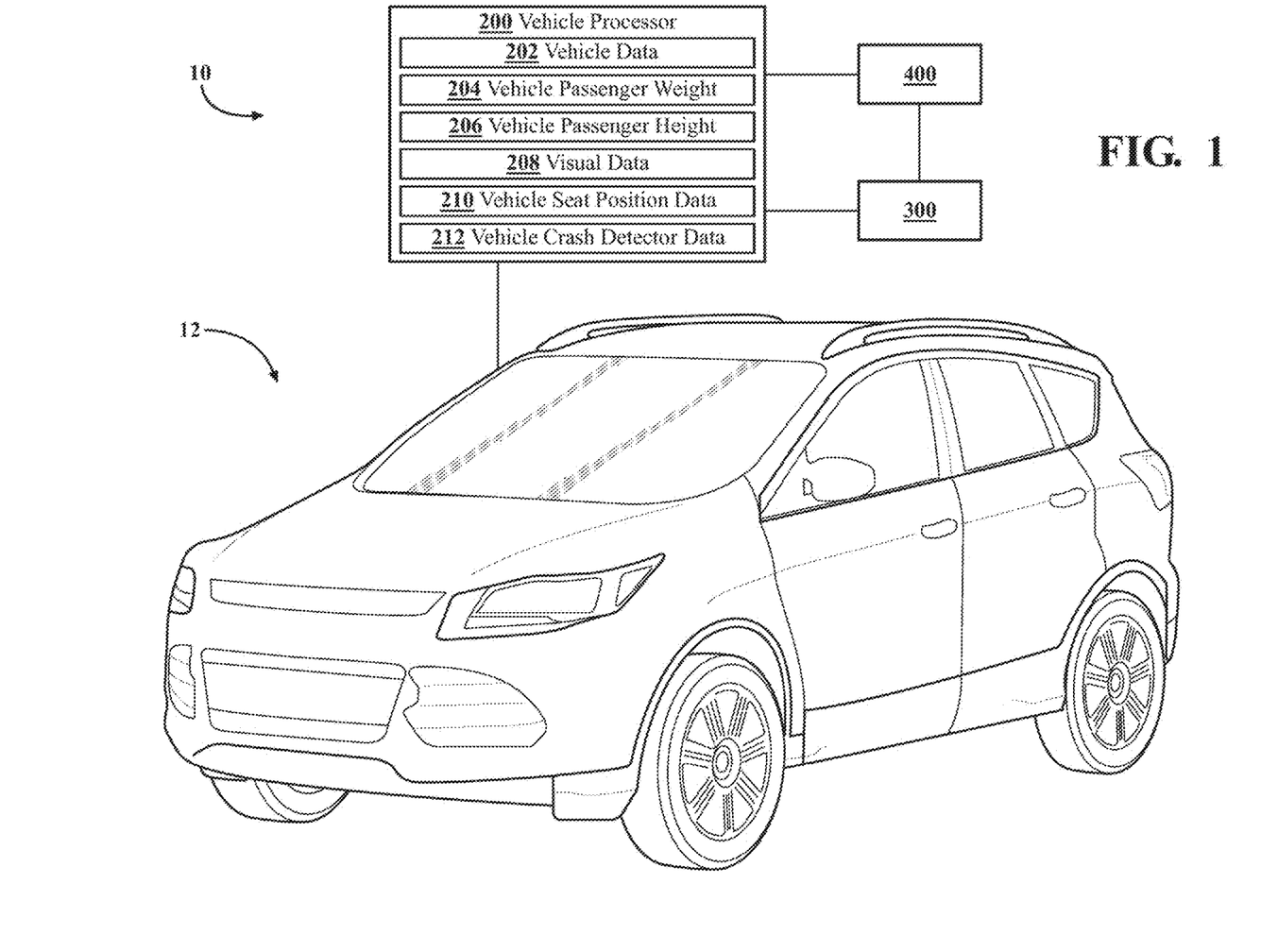
FIG. 1 is a perspective view of a vehicle exterior having a seatbelt system according to the present disclosure.

Referring now to the examples shown in FIGS. 1-9, a seatbelt system for a vehicle 12 is shown at reference number 10. The seatbelt system 10 includes a seatbelt assembly 14, a sensing system 100, a vehicle processor 200, a server 300, and a controller 400. Referring now to FIG. 1, in some examples, the vehicle 12 is contemplated to be an electric vehicle 12 (EV) and may include autonomous or semi-autonomous capabilities. Alternatively, the vehicle 12 may be a hybrid vehicle 12 incorporating both EV and internal combustion engine (ICE) components and capabilities. Moreover, in some examples, the vehicle 12 may incorporate fuel cell components and capabilities in addition to or in place of the EV and/or ICE components and capabilities. Additionally, the vehicle 12 may include only ICE components and capabilities, fuel cell components and capabilities, or use another power source, if desired.

Figure 2:
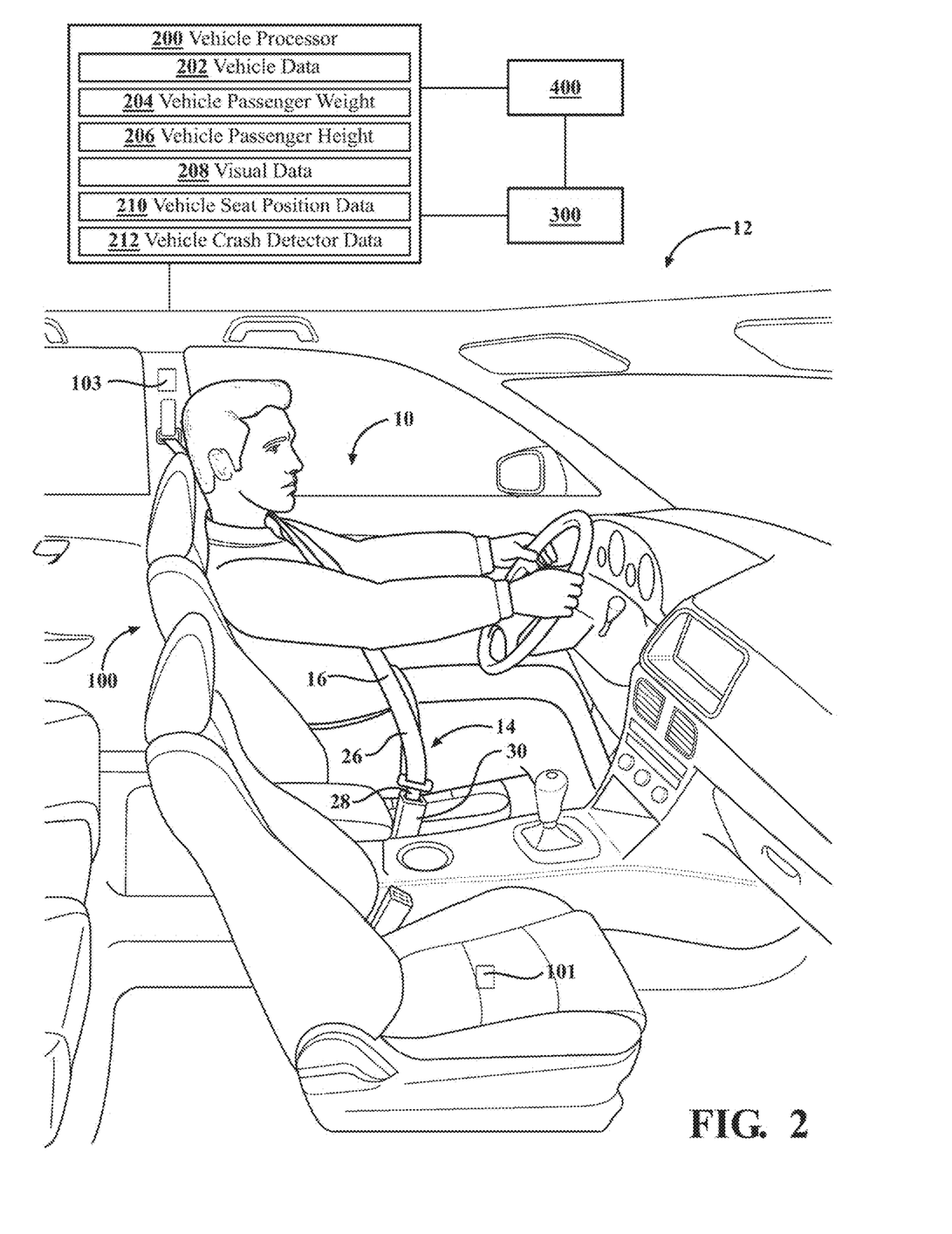
FIG. 2 is a perspective view of an interior of the vehicle of FIG. 1 having the seatbelt system according to the present disclosure.

Referring now to the examples shown in FIGS. 2-8, the vehicle 12 may include one or more seatbelt assemblies 14 disposed in a vehicle interior. The seatbelt assembly 14 includes a seatbelt 16, a base retractor 18, a pretensioner 20, and an electromagnet 22. As best shown in FIG. 2, the seatbelt 16 is configured to secure a vehicle passenger and spread impact forces across a vehicle passenger's body. The seatbelt 16 is movable between an unbuckled position and a buckled position (shown in FIG. 2). In some examples, the seatbelt 16 is a three-point seatbelt 16, however, a five-point seatbelt 16 and various other configurations have also been contemplated. In the example where the seatbelt 16 is a three-point seatbelt 16, the seatbelt 16 includes a lap portion 24 configured to be disposed over the user's lap when the seatbelt 16 is in the buckled position, a shoulder portion 26 configured to be disposed over the user's shoulder in the buckled position, and a tongue portion 28 configured to be inserted into a buckle 30 in the buckled position. The buckle 30 also includes at least one user-activated button to release the seatbelt 16 from the buckled position. In some examples, the seatbelt 16 is comprised of a webbed polyester material, although various other configurations have been contemplated. Additionally, the seatbelt 16 must have a length that allows for the seatbelt 16 to secure various sized passengers.

Figure 3:
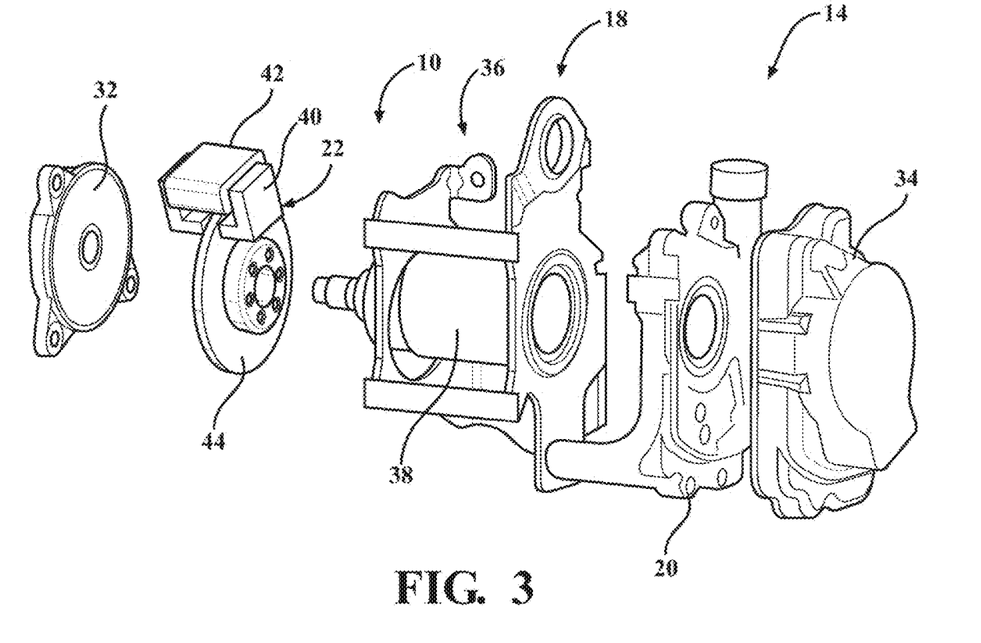
FIG. 3 is an exploded front perspective view of a seatbelt assembly of a seatbelt system according to one example of the present disclosure.

Referring still to the example shown in FIGS. 2-8, the base retractor 18 is coupled to the seatbelt 16 and is configured to allow the seatbelt 16 to extend to a desired length. More specifically, the base retractor 18 is coupled to the shoulder portion 26 of the seatbelt 16. As best shown in FIG. 3, the base retractor 18 includes a first end portion 32 including a biasing device, a second end portion 34 disposed opposite the first end portion 32 and including a speed-based locking mechanism, and a third portion 36 disposed between the first end portion 32 and the second end portion 34 and including a spindle 38 coupled to the shoulder portion 26 of seatbelt 16. In some examples, the spindle 38 of the third portion 36 is fixedly coupled to the shoulder portion 26 of the seatbelt 16 and configured to rotate to wind and unwind the seatbelt 16 onto the spindle 38. In some examples, the spindle 38 is generally cylindrical and also may define one or more apertures therethrough. In some examples, the third portion 36 may also include various coupling portions configured to be coupled to the first end portion 32 and the second end portion 34.

The first end portion 32 may include the biasing device coupled to the spindle 38 of the third portion 36. In some examples, the biasing device is a spiral spring configured to coil and uncoil in conjunction with rotation of the spindle 38. However, various biasing members have been contemplated. Additionally, in some examples, when the user moves the seatbelt 16 to the buckled position, the biasing device is tensed such that the tension in the biasing device allows the seatbelt 16 to move to the unbuckled position automatically when the tongue of the seatbelt 16 is released from the buckle. Moreover, the tension provided by the biasing device allows the spindle 38 to release sufficient length of seatbelt 16 depending on the size of the passenger and to not allow additional slack in the seatbelt 16 in the buckled position. Additionally, the first end portion 32 may also include a housing for the biasing device to prevent debris or other contaminants from interfering with the biasing device. In some examples, the housing may also define a plurality of apertures configured to allow the first end portion 32 to be secured to the third portion 36 and/or additional components.

Referring still to the example shown in FIG. 3, the second end portion 34 is disposed on an opposite side of the third portion 36 from the first end portion 32. The second end portion 34 may also include the speed-based locking mechanism. In some examples, the speed-based locking mechanism includes a sprocket mechanism, an arm, and a free-to-roll ball. The sprocket mechanism is fixedly coupled to the spindle 38 such that rotation of the spindle 38 corresponds with rotation of the sprocket mechanism. During normal vehicle operation, the arm remains in a non-contact position, which allows rotation of the sprocket mechanism. However, during a rapid vehicle deceleration, the ball is moved such that the ball forces the arm into a contact position, which prevents rotation of the spindle 38 mechanism and, thus, the spindle 38. In so doing, the spindle 38 is prevented from allowing further slack of the seatbelt 16. Once the rapid vehicle deceleration is over and normal vehicle operations resume, the ball moves back allowing the arm to move back to the non-contact position, thereby allowing movement of the spindle 38. However, various other configurations have also been contemplated. Moreover, it is also contemplated that the sprocket mechanism may be an electronic mechanism that similarly senses rapid deceleration of the vehicle 12 and prevents movement of the spindle 38. Additionally, the speed-based locking mechanism may be disposed at least partially within a housing to prevent debris or other contaminants from contacting the components.

Referring still to the example shown in FIG. 3, the seatbelt assembly 14 may also include the pretensioner 20. The pretensioner 20 is configured to retract some of the length of the seatbelt 16 the instant a collision occurs. This retraction restrains occupants quickly and reduces the amount they are moved forward in a moderate or severe frontal impact.

Additionally, the retraction of the seatbelt length by the pretensioner 20 secures the vehicle passenger in a proper position for additional safety features such as airbags. In some examples, the pretensioner 20 is an electronic pretensioner 20, however it is also contemplated that the pretensioner 20 may be a mechanical pretensioner 20 or have components of both an electronic pretensioner 20 and a mechanical pretensioner 20. In operation, in some examples, during a vehicle impact event, vehicle sensors may trigger an explosive pyrotechnic charge, which in turn moves a concealed piston. The spindle 38 is rotated by the movement of the piston and the length of the seatbelt 16 is reduced, which removes any slack in and tightens the seatbelt 16. In some examples, electronic pretensioners 20 may employ impact sensors, a computer module, and pyrotechnic gas generators that actuate in conjunction with airbag deployment. However, various other configurations have also been contemplated.

Referring now to the examples shown in FIGS. 3-6, the seatbelt assembly 14 also includes the electromagnet 22. The electromagnet 22 as described herein only uses energy to create resistance during a restraining event. This eliminates the need for a constant draw of high power. Different materials, wire sizes, and housings are able to be used in order to achieve the desired electromagnetic resistance. In some examples, the electromagnet 22 is configured to enable adjustment of rotational resistance applied to the spindle 38 based on vehicle passenger size. In some examples, the electromagnet 22 is configured to enable a continuous load of rotational resistance on the spindle 38 to prevent movement of the spindle 38. The electromagnet 22 may be coupled to the spindle 38 using a physical or electronic linkage, a torsion bar as described in more detail below, or a gear system 46 as also described in more detail below.

Figure 4:
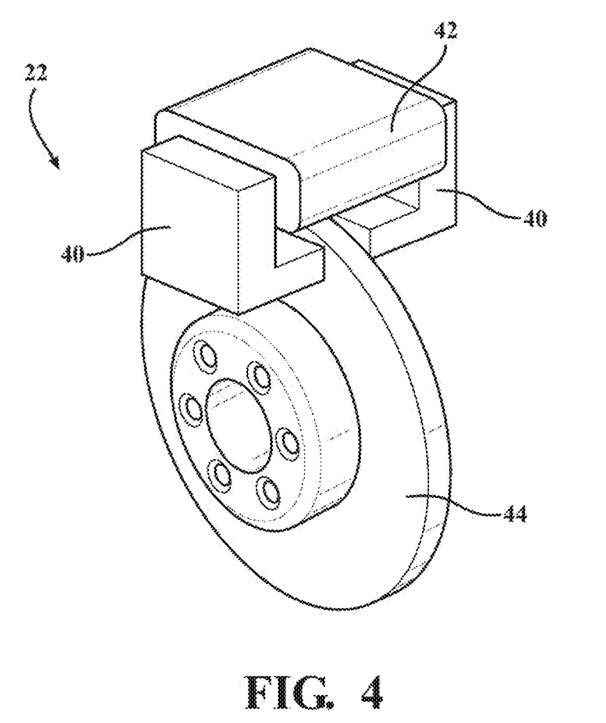
FIG. 4 is a front perspective view of an electromagnet of the seatbelt assembly of FIG. 3 according to one example of the present disclosure.
Figure 5:
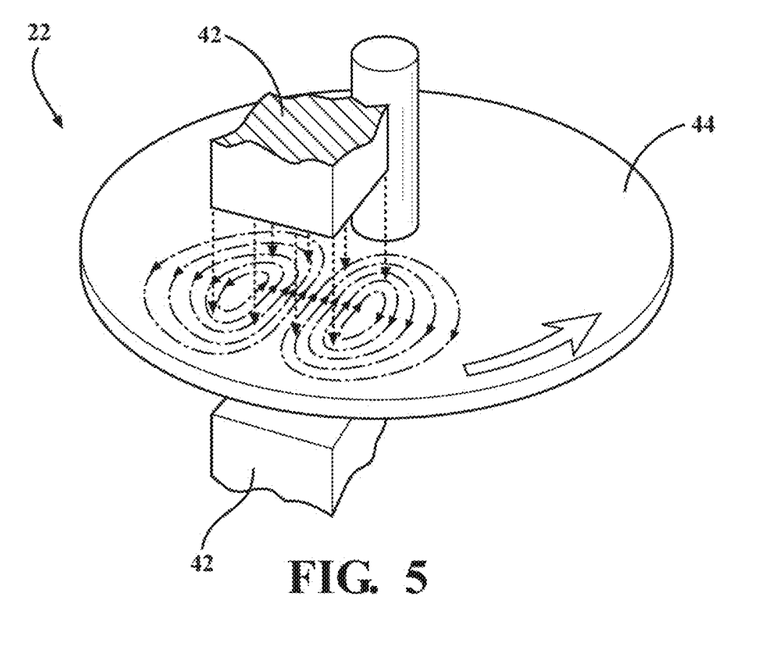
FIG. 5 is a schematic view of the electromagnet shown in FIG. 4 according to one example of the present disclosure.

Referring still to the example shown in FIGS. 3-5, the electromagnet 22 is disposed within or adjacent to the base retractor 18. Additionally, in some examples, the electromagnet 22 is disposed between the third portion 36 and the first end portion 32 of the base retractor 18. Moreover, in some examples, the electromagnet 22 is at least partially disposed within the spindle 38 of the third portion 36 of the base retractor 18. However, it is also contemplated that the electromagnet 22 may be disposed adjacent to the spindle 38 or otherwise near the spindle 38.

Figure 6:
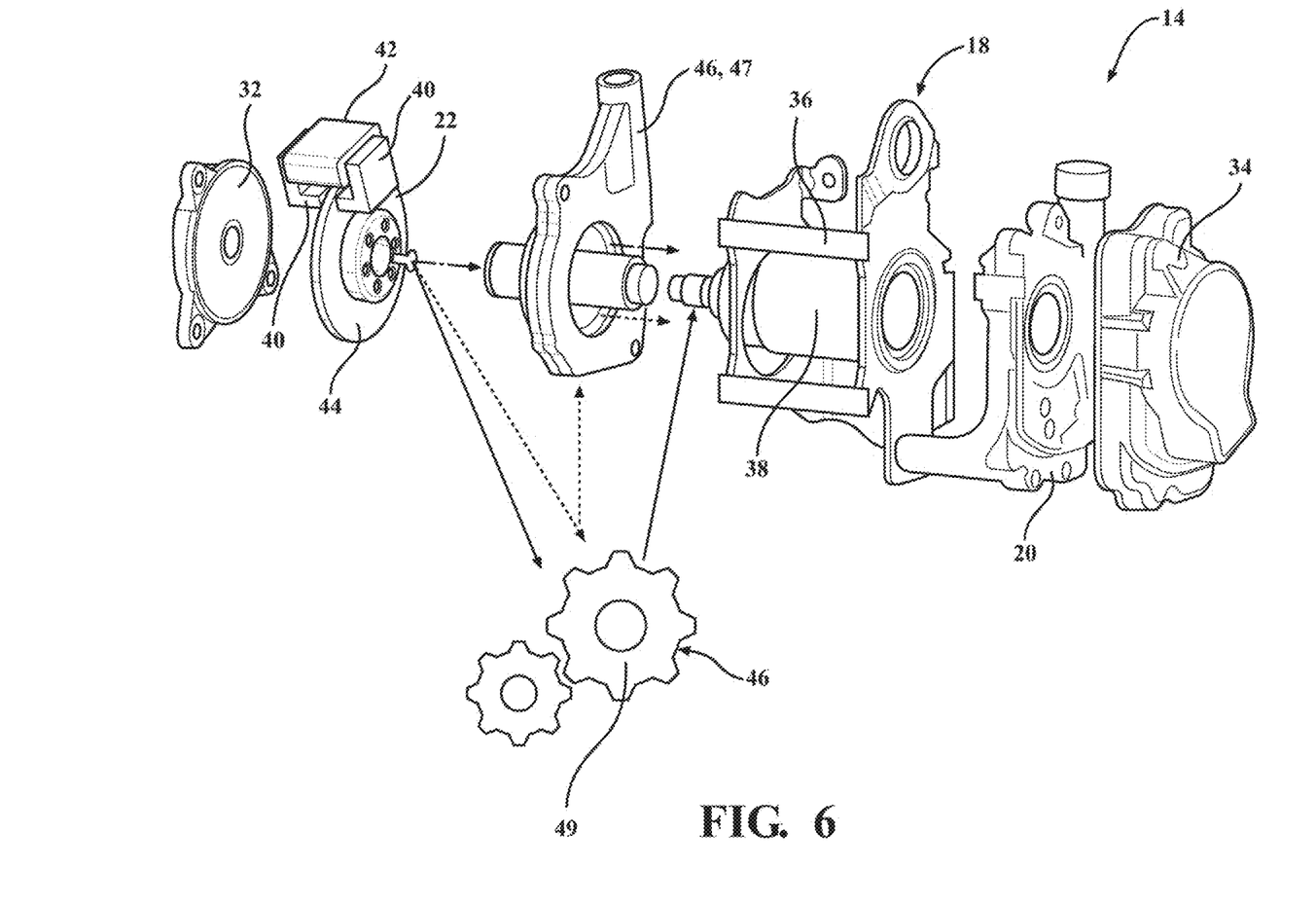
FIG. 6 is an exploded front perspective view of a seatbelt assembly of a seatbelt system according to another example of the present disclosure.

As best shown in FIGS. 5 and 6, the electromagnet 22 may include a winding base 40, a winding core 42, and a disk 44. The winding base 40 includes the North (N) and South(S) poles coupled to either side of the disk 44. The winding core 42 is disposed between the N and S poles of the winding base 40 and is configured to support wires that are wrapped thereon and selectively supplied with current. In some examples, supplying current to the wires rotates the disk 44, which provides the rotational resistance to the spindle 38. However, various other configurations have been contemplated.

In some examples, the seatbelt assembly 14 also includes the torsion bar. When present, the torsion bar is coupled to the base retractor 18. The torsion bar is configured to apply a pre-specified baseline load to the spindle 38. As such, the needed electrical resistance of the electromagnet 22 can be lessened by incorporating a base level torsion bar into the system. Specifically, in some examples, the torsion bar is a small, cylindrical bar of relatively soft metal disposed in the spindle 38. When a vehicle impact event occurs, the continuing load on the seatbelt 16 will cause the torsion bar to twist and rotate and prevent movement of the seatbelt 16. In doing so, the twisting of the torsion bar will use up some of the energy of the impact and lower the load of electrical resistance required to prevent rotation of the spindle 38 by the electromagnet 22.

Additionally, in some examples such as the example shown in FIG. 6, the seatbelt assembly 14 also includes a gear system 46. The gear system 46 is coupled to the base retractor 18 and configured to reduce a base load of the electrical resistance required by the electromagnet 22. In the example shown, the gear system 46 includes a plurality of gears coupled to one another, which mechanically lowers the load required to prevent movement of the spindle 38. For example, the gear system 46 could be implemented in a load limiter 47 and/or could be implemented as meshed gears 49. In the example shown, a load limiter 47 is disposed between the electromagnet 22 and the spindle 38 and may include internal gearing that inhibits rotation of the spindle 38. Further, the gear system 46 may include two or more gears 49 that are meshed with one another and inhibit rotation of the spindle 38. For example, a first gear 49 could be fixed for rotation with the spindle 38 and a second gear 49 could be meshed with the first gear 49 and be rotatably supported by a housing of the retractor 18 proximate to the spindle 38. Alternatively, one of the gears 49 could be supported by the winding base 40 and could mesh with another gear 49 that is rotatably supported by the housing of the retractor 18—if a load limiter 47 is not used—or is rotatably supported by a housing of the load limiter 47. Use of the load limiter 47 and/or the gears 49 reduces the load required to restrict rotation of the spindle 38 by the electromagnet 22, thereby reducing the power consumed by the electromagnet 22 during operation.

Figure 7:
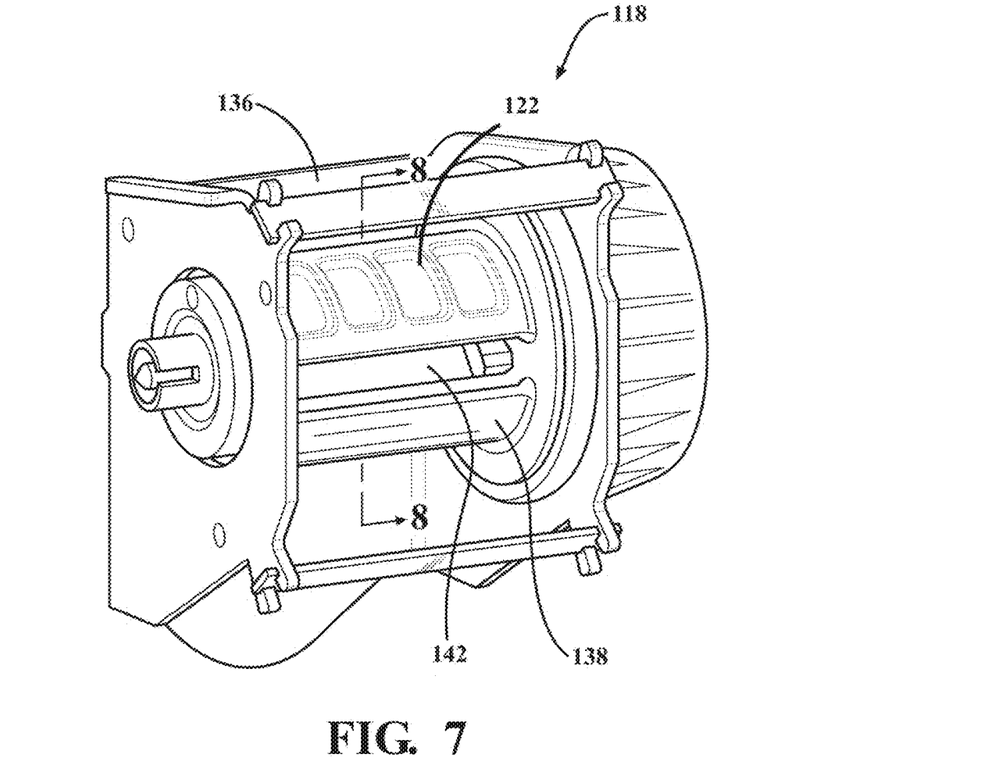
FIG. 7 is a front perspective view of an electromagnet of a seatbelt assembly according to another example of the present disclosure.
Figure 8:
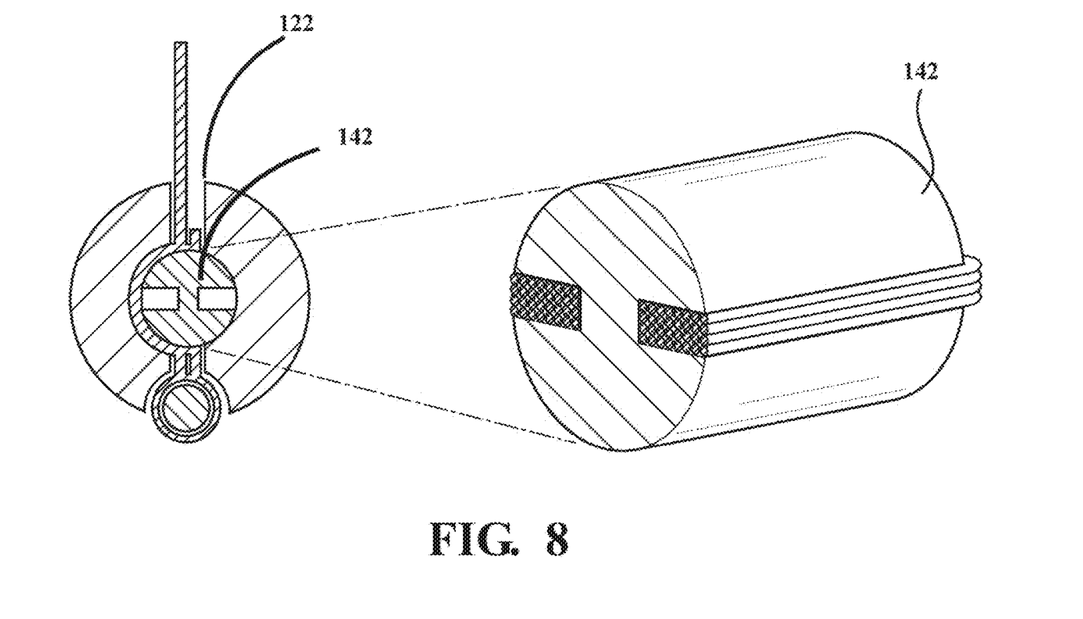
FIG. 8 is a cross-sectional view of the electromagnet of FIG. 7.

Referring now to the example shown in FIGS. 7 and 8, in some examples, an electromagnet 122 is similar to the electromagnet 22 as described above and shown in FIGS. 3-6, such that the electromagnet 122 is configured to enable adjustment of rotational resistance applied to the spindle 138 based on vehicle passenger size. However, in the example shown in FIG. 8, the electromagnet 122 is housed completely inside the spindle 138. In the example shown, the electromagenet 122 includes a cylindrical winding core 142 having N and S poles. Moreover, in some examples, wires are wound lengthwise on the winding core 142 and are activated by a variable current source to alter the rotational resistance. The electromagnet 122 may be mechanically connected to the spindle 138 such that rotation of the electromagnet 122 restricts rotation of the spindle 138 when the electromagnet 122 is energized. Namely, when the spindle 138 is urged to rotate by the seatbelt 16 when the seatbelt 16 is loaded (i.e., during a vehicle impact event), the electromagnet 122 may be energized and rotated in the opposite direction to counteract these forces. Alternatively, the electromagnet 122 may be disposed within and frictionally coupled to the spindle 138 such that an outer diameter of the electromagnet 122 is frictionally engaged with an inner diameter of the spindle 138. As such, if the electromagnet 122 is rotated in an opposite direction than the spindle 138 when loaded by the seatbelt 16, the rotation of the electromagnet 122 will restrict rotation of the spindle 138 due to the frictional engagement between the electromagnet 122 and the spindle 138.

Referring again to the examples shown in FIGS. 1-9, the seatbelt system 10 also includes the sensing system 100 configured to sense a size of the vehicle passenger on the vehicle seat. In some examples, the sensing system 100 is configured to measure and/or sense biometrics (i.e., measurable physical characteristics) of the vehicle passenger on each vehicle seat in the vehicle 12. To measure the physical characteristics, the sensing system 100 may include various sensors. In some examples, the sensing system 100 may include one or more weight sensing mechanisms or weight sensors 101 to measure a weight of the vehicle passenger. Additionally, the sensing system 100 may include one or more height sensing mechanisms or height sensors 103 to measure a height of the vehicle passenger. Moreover, in some examples, the sensing system 100 may include a plurality of cameras to provide visual information about the vehicle passenger(s). In some examples, the sensing system 100 also includes a sensing mechanism to provide information related to the vehicle seat position data 210. The vehicle seat position sensing mechanisms may include cameras for visual information related to the seat position or may include internal sensors that automatically sense vehicle seat position constantly or any time the vehicle seat position may change. As shown in FIG. 2, the height sensor 103 is a camera that can sense both the height of the vehicle occupant and the position of the vehicle seat.

Referring still to the examples shown in FIGS. 1-9, the sensing system 100 is coupled to the vehicle processor 200 and the vehicle processor 200 is configured to gather and/or store vehicle data 202 of the vehicle 12. It is also contemplated that the vehicle processor 200 may communicate any or all of the vehicle data 202 to the controller 400 and/or the server 300 for further processing and/or evaluation. It is also contemplated that the vehicle processor 200, the controller 400, and/or the server 300 may continuously and/or regularly update such that the vehicle data 202 is updated in real time. While not specifically shown, the processor 200 may include or incorporate memory hardware that stores the data received from the sensing system 100.

The vehicle data 202 may include vehicle passenger weight 204, the vehicle passenger height 206, visual data 208, vehicle seat position data 210, and impact detection data 212. However, any other data measured and/or sensed by the vehicle 12 may also be stored by the vehicle processor 200. The vehicle passenger weight 204 generally pertains to any data sensed by the sensing system 100 related to the load of the passenger to be secured by the seatbelt assembly 14. Further, the vehicle passenger height 206 generally pertains to any data sensed by the sensing system 100 related to a height of the passenger to be secured by the seatbelt assembly 14. In some examples, the visual data 208 generally pertains to any clothing items such as hats that may affect measured vehicle passenger height 206 data, additional items placed on the vehicle seat or vehicle passenger that may affect measured vehicle passenger weight 204, or vehicle passenger posture that may affect vehicle passenger height 206. Additionally, the vehicle seat position data 210 generally pertains to any data related to a position of the vehicle seat including, but not limited to, seatback position and/or seat base position.

The impact detection data 212 generally pertains to data relating to whether the vehicle 12 has been in an impact event. In some examples, the impact detection data 212 includes vehicle speed, vehicle acceleration, vehicle location and the like. Additionally, in some examples, the impact detection data 212 includes data relating to whether an impact is imminent and the location of the impact with respect to the vehicle 12. More specifically, the impact detection data 212 may include data gathered from vehicle cameras or sensors inside or outside of the vehicle 12.

With further reference to FIGS. 1-9, the server 300 is configured as a network and/or a cloud-based system that communicates with one or both of the vehicle processor 200 and the controller 400. Additionally, in some examples, the server 300 is configured to determine the desired load level of the electromagnet 22, 122 based on one or more of the vehicle passenger weight 204, the vehicle passenger height 206, and the visual data 208. In some examples, the server 300 applies an algorithm that uses vehicle passenger height 206 and/or vehicle passenger weight 204 to determine the desired load level of the electromagnet 22, 122. The desired load level of the electromagnet 22, 122 may be determined upon user activation such as buckling the seatbelt 16 or may be continuously determined. In some examples, the desired load level of the electromagnet 22, 122 is based on the biometrics of the vehicle passenger stored in a cloud-based profile on the server 300, along with any vehicle passenger preferences. Additionally, it is contemplated that the server 300 may store any vehicle data 202 related to the vehicle passenger as encrypted information to protect the privacy of the vehicle passenger. The vehicle data 202 and/or the passenger preferences may be continuously updated by the user and/or the server 300.

For example, when the vehicle passenger is seated and the vehicle 12 is activated, the sensing system 100 may activate and transmit the vehicle passenger weight 204, the vehicle passenger height 206, and the visual data 208 to the server 300 where the server 300. The server 300 may then determine the desired load level of the electromagnet 22, 122 to counteract forces exerted on the retractor 18 in the event that the vehicle 12 experiences an impact event. In some examples, if a first vehicle passenger weight 204 is higher than a second vehicle passenger weight 204, the server 300 may determine that the desired load level of the electromagnet 22, 122 and the applied load of the electromagnet 22, 122 will be higher for the seatbelt assembly 14 corresponding to the first vehicle passenger. Additionally, in some examples, if a first vehicle passenger height 206 is greater than a second vehicle passenger height 206, the server 300 may determine that the desired load level of the electromagnet 22, 122 will be higher for the seatbelt assembly 14 corresponding to the first vehicle passenger. Moreover, in some examples, visual clues may also be factored into the desired load level of the electromagnet 22, 122, including, but not limited to, clothing items such as hats that may affect measured vehicle passenger height 206 data, additional items placed on the vehicle seat or vehicle passenger that may affect measured vehicle passenger weight 204, or vehicle passenger posture that may affect vehicle data 202 and/or the desired load level of the electromagnet 22, 122.

In some examples, the server 300 is also configured to determine if an impact is imminent and determine a desired load level to be applied based on the impact detection data 212 such as a direction of the impact. For example, if the server 300 determines an impact is imminent based on vehicle camera data showing another vehicle rapidly approaching the vehicle 12 from behind, the server 300 may determine the desired amount of electrical resistance to be applied to the spindle 38 via the electromagnet 22, 122 in anticipation of the impact to provide optimum position and safety to the vehicle passenger(s).

Additionally, the controller 400 is a local vehicle controller housed within the vehicle and is coupled to one or more of the vehicle processor 200 and the server 300. In some examples, the controller 400 is a seatbelt assembly controller such that the controller 400 is only configured to control functions of the seatbelt assembly 100. However, it is also contemplated that the controller 400 may be configured to control additional vehicle functions including, but not limited to, vehicle speed limitations or airbag functions. Moreover, the controller 400 is configured to apply the desired load level of the electromagnet 22, 122 to the electromagnet 22, 122. More specifically, the controller 400 applies the desired load level of the electromagnet 22, 122 to each of the seatbelt 16 assemblies of the vehicle 12. In some examples, the applied load to each of the seatbelt 16 assemblies of the vehicle 12 is different and customized to the specific vehicle passenger based on specific biometric and/or passenger profile information. In some examples, the controller 400 is configured to apply DC current to the electromagnet 22, 122 to restrict movement of the spindle 38. The DC current supply may be powered from an auxiliary power module, from a vehicle battery, or from another power source (none shown).

Figure 9:
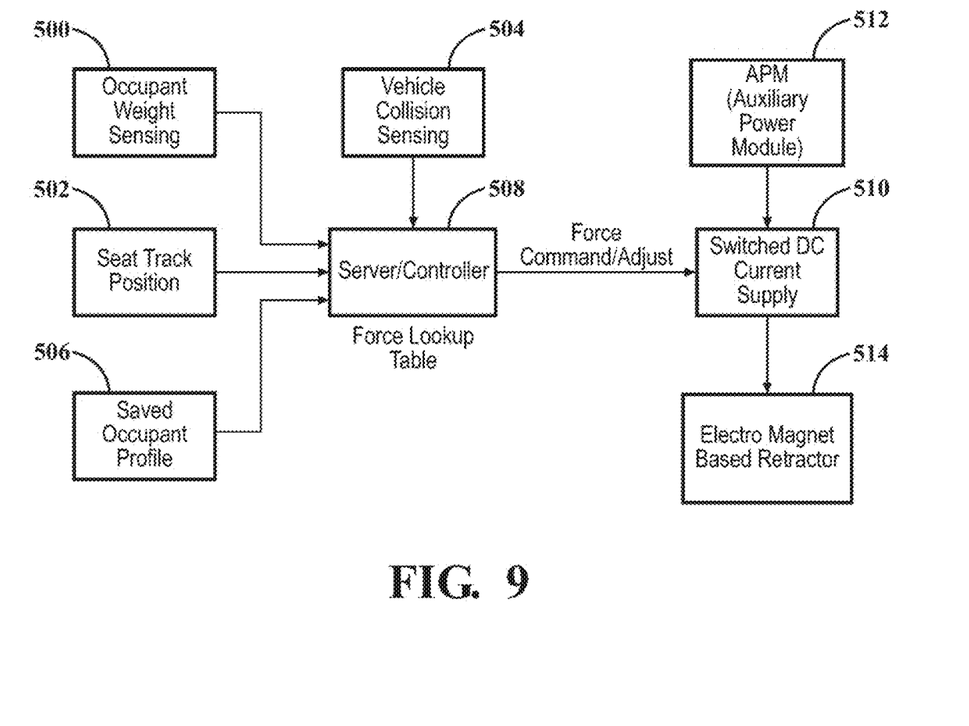
FIG. 9 is a functional block diagram according to one example of the present disclosure.

Referring now to the exemplary functional block diagram illustrated in FIG. 9, in some examples, when activated, the sensing system 100 senses the vehicle passenger weight 204 at step 500, the vehicle seat position at step 502, and impact detection data 212 at step 504 and sends this data to the vehicle processor 200. The vehicle processor 200 may also receive information related to the cloud-based profile stored on the server 300 at step 506 for one or more vehicle occupants. The vehicle passenger weight 204, the vehicle seat position data 210, the impact detection data 212, and the information related to the saved vehicle passenger profile is sent to the server 300. The server 300 is then configured to determine the desired load limit to apply to the spindle 38 of the base retractor 18 at step 508. In some examples, the server 300 may use a force look-up table or other applications make the determination. Once the desired load limit is determined, the controller 400 is configured to apply the load by switching the DC current supply at step 510. The DC current supply may be powered from an auxiliary power module at step 512. Finally, the DC current supply is sent to the electromagnet 22, 122 to restrict/prevent movement of the spindle 38 at step 514.

Current seatbelt restraint systems are designed to be balanced across various sized anthropomorphic test devices (ATDs) to meet performance targets due to mechanical limitations, creating non-ideal restraint systems for each occupant. For example, various sized ATDs include occupants of a range of sizes, including adults that are 5th percentile female, 50th percentile male, 95th percentile male, and child occupants. The seatbelt system 100 as described herein using the electromagnet 22, 122 enables a customizable and continuous load limiting system tailored to each occupant size. The use of the electromagnet 22, 122 enables a more dynamic, customizable system compared to current technology. Using the electromagnet 22, 122 to apply resistance allows the load to be adjusted dynamically to create constant load, step ups, step downs, and multiple other load profiles. This also enables the seatbelt assembly 14 to be adapted to each individual occupant based on their biometric characteristics. The seatbelt system 10 as described herein helps improve vehicle safety ratings by personalizing the load based on passenger biometrics and allows for easier fine tuning adjustments in the seatbelt system 10.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A seatbelt assembly for a vehicle comprising:
a seatbelt configured to secure a vehicle passenger and spread impact forces across a body of the vehicle passenger;
a base retractor coupled to the seatbelt and configured to allow the seatbelt to extend to a desired length, the base retractor including:
a first end portion including a biasing device;
a second end portion disposed opposite the first end portion; and
a third portion disposed between the first end portion and the second end portion and including a spindle coupled to the seatbelt;
a pretensioner coupled to the base retractor and configured to tighten slack of the seatbelt to ensure proper position of the vehicle passenger;
an electromagnet disposed within or adjacent to the base retractor;
a sensing system configured to measure a biometric of the vehicle passenger, the biometric including at least one of a vehicle passenger weight or a vehicle passenger height; and
a controller communicatively coupled to the sensing system and the electromagnet, the controller configured to:
determine a predetermined load profile for the electromagnet based on the measured biometric, the predetermined load profile defining a variable rotational resistance to be applied to the spindle over a duration of a vehicle impact event; and
apply a variable current to the electromagnet during the vehicle impact event to generate the variable rotational resistance on the spindle corresponding to the predetermined load profile.

2. The seatbelt assembly of claim 1, wherein the electromagnet is disposed between the third portion and the second end portion of the base retractor.

3. The seatbelt assembly of claim 1, wherein the electromagnet is at least partially disposed within the spindle of the third portion of the base retractor.

4. The seatbelt assembly of claim 1, wherein the electromagnet includes a winding base, a winding core, and a disk.

5. The seatbelt assembly of claim 1, wherein the sensing system is further configured to measure vehicle seat position data, and wherein the controller is configured to determine the predetermined load profile based on the measured biometric and the vehicle seat position data.

6. The seatbelt assembly of claim 1, wherein the seatbelt assembly is a three-point seatbelt assembly.

7. The seatbelt assembly of claim 1, further comprising a plurality of gears coupled to the base retractor and configured to reduce a base load of the electromagnet.

8. A vehicle incorporating the seatbelt assembly of claim 1.

9. A seatbelt system for a vehicle seat, the seatbelt system comprising:
a sensing system configured to measure a biometric of a vehicle passenger, the biometric including at least one of a vehicle passenger weight or a vehicle passenger height;
a seatbelt assembly including:
a seatbelt configured to secure the vehicle passenger and spread impact forces across a body of the vehicle passenger;
a base retractor coupled to the seatbelt and configured to allow the seatbelt to extend to a desired length;
a pretensioner coupled to the base retractor and configured to tighten slack of the seatbelt to ensure proper position of the vehicle passenger;
an electromagnet coupled to the base retractor; and
a controller communicatively coupled to the sensing system and the electromagnet, the controller configured to:
determine a predetermined load profile for the electromagnet based on the measured biometric, the predetermined load profile defining a variable rotational resistance to be applied to a spindle over a duration of a vehicle impact event; and
apply a variable current to the electromagnet during the vehicle impact event to generate the variable rotational resistance on the spindle corresponding to the predetermined load profile.

10. The seatbelt system of claim 9, wherein the sensing system includes at least one weight sensor configured to measure the vehicle passenger weight.

11. The seatbelt system of claim 9, wherein the sensing system includes at least one height sensor configured to measure the vehicle passenger height.

12. The seatbelt system of claim 9, wherein the electromagnet includes a winding base, a winding core, and a disk.

13. The seatbelt system of claim 9, wherein the sensing system is further configured to measure vehicle seat position data, and wherein the controller is configured to determine the predetermined load profile based on the measured biometric and the vehicle seat position data.

14. The seatbelt system of claim 9, wherein the seatbelt assembly is a three-point seatbelt assembly.

15. A vehicle incorporating the seatbelt system of claim 9.

16. A seatbelt system for a vehicle, the seatbelt system comprising:
a seatbelt assembly including a seatbelt, a base retractor having a spindle coupled to the seatbelt, and an electromagnet coupled to the base retractor;
a sensing system configured to measure a biometric of a vehicle passenger, the biometric including at least one of a vehicle passenger weight or a vehicle passenger height;
a vehicle processor for storing vehicle data including one or more of the vehicle passenger weight and the vehicle passenger height, the vehicle processor configured to:
determine a predetermined load profile for the electromagnet based on the measured biometric, the predetermined load profile defining a variable rotational resistance to be applied to the spindle over a duration of a vehicle impact event; and
apply a variable current to the electromagnet during the vehicle impact event to generate the variable rotational resistance on the spindle corresponding to the predetermined load profile; and
a server communicatively coupled to the vehicle processor and configured to determine a desired load level of the electromagnet based on one or more of the vehicle passenger weight and the vehicle passenger height.

17. The seatbelt system of claim 16, further comprising a controller configured to apply the desired load level of the electromagnet to the electromagnet.

18. The seatbelt system of claim 16, wherein the electromagnet includes a winding base, a winding core, and a disk.

19. The seatbelt system of claim 16, wherein the seatbelt assembly is a three-point seatbelt assembly.

20. A vehicle incorporating the seatbelt system of claim 16.

* * * * *